United States Patent [19]

Duncan et al.

[11] 4,289,111
[45] Sep. 15, 1981

[54] FRYING APPARATUS

[75] Inventors: Michael E. Duncan, Bletchley; Philip J. Whittington, Chinnor; Michael P. Kimber, Henley on Thames, all of England

[73] Assignee: DCA Industries Limited, Bucks, England

[21] Appl. No.: 76,547

[22] Filed: Sep. 18, 1979

[30] Foreign Application Priority Data

Feb. 20, 1979 [GB] United Kingdom ............... 05981/79

[51] Int. Cl.³ ............................................ A47J 27/00
[52] U.S. Cl. ..................................... 126/391; 99/408; 126/360 A
[58] Field of Search ................... 126/360 A, 350, 391; 99/408

[56] References Cited

U.S. PATENT DOCUMENTS

| 2,452,472 | 10/1948 | Keating | 126/391 |
| 2,655,144 | 10/1953 | Keating | 126/391 |
| 2,912,975 | 11/1959 | Del Francia | 126/391 |
| 3,263,596 | 8/1966 | Thomas | 126/391 |
| 3,990,433 | 11/1976 | Keating | 126/391 |

FOREIGN PATENT DOCUMENTS 677 1/1978 South Africa .
1473320 5/1977 United Kingdom .

Primary Examiner—Ronald C. Capossela
Attorney, Agent, or Firm—Armstrong, Nikaido, Marmelstein & Kubovcik

[57] ABSTRACT

Food frying apparatus comprising a frying kettle heated by at least one high intensity suction burner located in a removably mounted heat exchanger tube. The frying apparatus according to the invention allows more efficient fuel combustion than existing fryers, with a consequent saving fuel costs.

7 Claims, 3 Drawing Figures

FRYING APPARATUS

FIELD OF THE INVENTION

This invention relates to frying apparatus.

GENERAL DESCRIPTION OF THE PRIOR ART

Food fryers which are currently in use for commercial food frying comprise a frame supporting a rectangular tank or kettle of oil. A number of heat exchange tubes are permanently fitted in the lower half of this kettle and extend across its width. Each of these tubes has associated with it a gas burner which is placed so that the flame from the burner enters the tube at one end. The gas burners are fed by a gas supply manifold. At the end of the tube remote from the burner, the exhaust gases from the individual tubes are collected together and exhausted up a common flue pipe by convection to the atmosphere. Along the length of each heat exchanger tube, a baffle of spiral form is generally placed. The function of this baffle is to cause the flame to heat more of the surface area of the heat exchange tube, and to reduce the rate at which the flame passes along the tube. It is necessary to provide a large number of heat exchanger tubes in order to provide sufficient heat from the gas burners used, to raise the oil to the frying temperature of 190° to 195° C. required and to maintain it at this temperature. In addition, it is necessary for the tubes to be permanently fitted in the kettle in order to isolate the burners from the oil so that there is no possibility of the oil being ignited by the open flame of the burner.

Fryers of this type are generally used for the continuous frying of food products, and are provided with a conveying system, driven continuously by a geared motor mounted in the support frame, to transport the product along the length of the kettle. A turnover device and/or a submerger device may be built into the system to aid complete frying of the product.

There are two major shortcomings of this type of fryer which result from the fact that the heat exchanger tubes are permanently fitted in the kettle. The tubes have to be joined to the sides of the kettle by a braising technique, which is expensive and involves the use of specialist skilled labour. Secondly, when the fryer is in operation, the essential regular cleaning and maintenance of the unit have to be carried out with the tubes in position.

DESCRIPTION OF THE INVENTION

The present invention therefore provides a frying apparatus comprising a frying kettle adapted to contain a frying medium, a pre-heater tank from which liquid frying medium can pass to said kettle, at least one heat exchanger tube removably fitted in said kettle, means for connecting one high intensity suction burner, adapted to produce combustion in said tube, to each of said heat exchanger tubes, a suction device operable to produce a forced flow of combustion gases in said heat exchanger tubes and exhaust said combustion gases from said heat exchanger tubes and an additional heat exchanger tube fitted to said pre-heater tank and adapted to receive hot gases from said suction device.

In a preferred embodiment of the frying apparatus according to the invention, two heat exchanger tubes are provided and these are mounted through one end of said frying kettle one close to each corner, and extend down said kettle and loop back to the centre of said end through which they are mounted. The ends of said heat exchanger tubes close to the corners of said kettle are provided with said suction burners, and are suitably attached to said burners through holes in the wall of said kettle. A preferred method of attachment is by means of bolts which extend through said kettle wall. The ends of the exchangers remote from said heaters are similarly attached through holes in said end wall of the kettle and are collected together into a manifold, which can be connected to a suction device, such as a high temperature centrifugal fan or a flue gas inducer. Said suction device is preferably provided with an independent damper for each tube, so that the suction in each tube can be adjusted independently.

The exhaust from said suction device is preferably directed by a valve into two tubes, one of which is redirected through said pre-heater tank and the other of which bypasses this tank but it is reconnected with the exhaust which has been directed through the tank, and finally discharged to the atmosphere. The proportion of exhaust gases used to heat said pre-heater tank is controlled by means of the valve so that excessive pre-heating of the frying medium does not occur.

The frying apparatus according to the invention is particularly suitable for use in continuous frying operations, and in such operations it is provided with a conveyor which is preferably powered by an intermittent drive, the movement of which is at a fixed speed. Frying times can be altered by varying the dwell times of the intermittent motion. The drive to the conveyor is made through the frying kettle wall and is connected by gears to the conveyor. A driven gear on the kettle engages with a gear on the conveyor. This facilitates quick removal of the conveyor for repair and maintenance. A turn-over device and/or a submerger device are preferably provided in addition to the conveyor system, to aid complete frying of the product.

The frying apparatus according to the invention is preferably provided with a filter for the frying medium. Contaminated frying medium, is extracted from the kettle and filtered through a filter paper and recycled to the frying kettle. The filter paper used is suitably one which has a 30 m particle retention capacity. The use of such a filter unit extends the life of the frying medium. The filter unit can be heated by means of the flue gases exhausted from the heat exchanger tubes by means of the suction device.

The invention also provides a method of frying food products in which the food products are fried in a food fryer according to the invention.

The food fryer according to the invention is particularly suitable for frying bakery products such as yeast raised and chemically raised doughnuts of all shapes and for frying frozen and unfrozen products made from fish, meat poultry, vegetables, fruit or mixtures thereof, which may be coated in batter or breadcrumbs, or uncoated.

BRIEF DESCRIPTION OF THE ACCOMPANYING DRAWINGS

The invention will now be further described with reference to the accompanying drawings, in which.

DESCRIPTION OF THE PREFERRED EMBODIMENT

Figure 1:
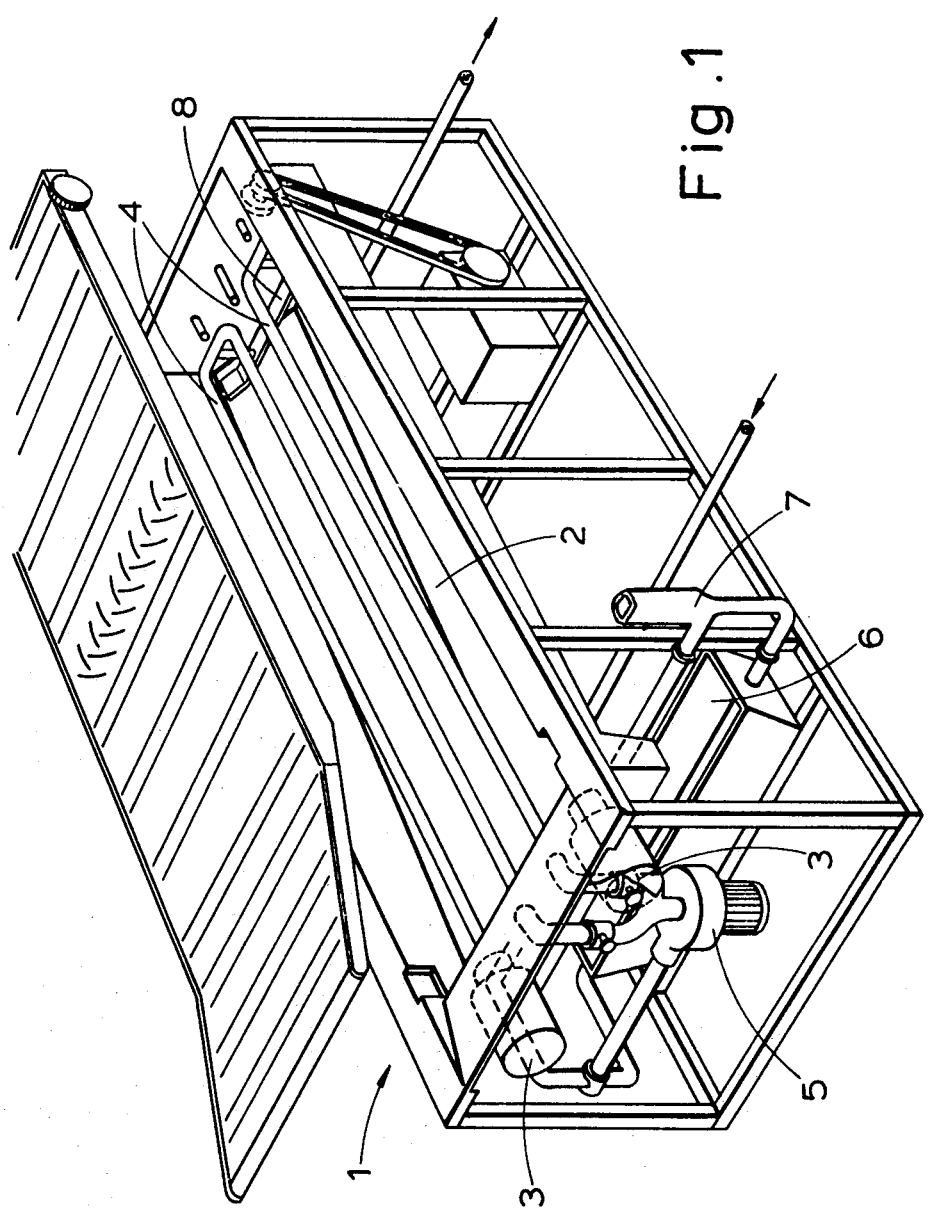
FIG. 1 shows a general view of a preferred embodiment of a food fryer according to the invention fitted with a conveyor with a turn-over and submerger device.
Figure 2:
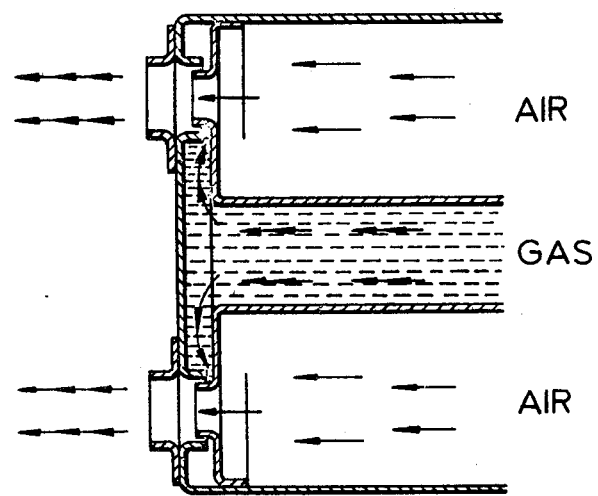
FIG. 2 is a section through the end wall of the food fryer of FIG. 1 and shows the arrangement of the burner.
Figure 3:
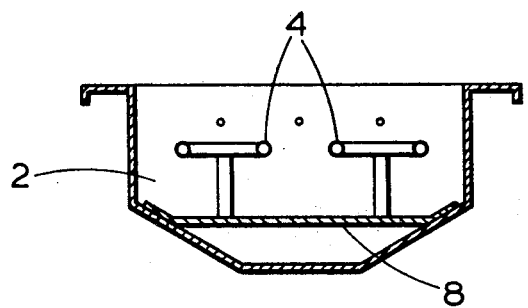
FIG. 3 shows the arrangement by which the heat exchanger tubes are supported at the end of the kettle remote from the burners.

As shown in FIG. 1, the food fryer 1 comprises a kettle 2 for oil, the base of which slopes towards the centre and towards the end remote from the burners, the centre of which is the deepest point in the kettle.

The fryer is fitted with two burners 3 each of which is attached to a heat exchanger tube 4 placed inside the kettle. The ends of the heat exchanger tubes 4 remote from the burners are collected together into a manifold which is connected to a suction device 5. The exhaust from this suction device is directed via a valve into two tubes, one of which is used to heat fat in the fat pre-heater tank 6, and the tubes are then recombined and vented to the atmosphere at 7.

The heat exchanger tubes and burners are removably mounted to the kettle by means of bolts. The heat exchanger tubes are supported by means of plates 8 at the end of the kettle remote from the burners. Burners which are particularly suitable for use in the food fryers according to the invention are the Thermimax T50 and T72 (Thermimax is a Registered Trade Mark) high intensity burners manufactured by Dunlop Ltd. These heaters have a maximum output of 263,000 kilojoules/hour and 526,000 kilojoules/hour respectively and a food fryer containing two such T72 heaters could be used to heat a volume of up to 1200 liters of oil. Where the food products to be fried are, for example, doughnuts, such a fryer would have a frying capacity of up to 2,400 dozen doughnuts per hour.

The food fryers according to the invention are particularly suitable for use in continuous frying processes and for use in such processes, a conveying system as shown in FIG. 1 is fitted to the fryer. This conveyor system comprises a series of flight bars, defining flight pockets between them.

In operation, the products are placed into the flight pockets between the flight bars and are supported on a perforated plate until they become buoyant and float in the fat or oil. The conveyor moves them by intermittent motion down the frying kettle, the convection currents centering the doughnuts in the kettle until the turner is reached. On reaching the turner, the doughnuts are flipped over into another pocket between flight bars and are transported down the second section of the frying kettle and ejected on an incline conveyor as they leave the fat or oil. The turner device is operated pneumatically and is driven independently of the conveyor. This allows maximum control of the turner to suit operating conditions. Oil or fat absorbed by the product is replenished from a makeup tank at a controlled rate to a level determined by an overflow weir which is built into the frying kettle wall. The makeup fat or oil re-entry point is so designed to minimise fat splashing and aeration.

As shown in FIG. 1, the base of the frying kettle slopes towards the centre and towards the end remote from the burners, which where the fryer is used for continuous operation is the infeed end. The sloping base facilitates removal of frying debris from the fryer at the infeed end, and subsequent filtration and replenishment at the discharge end. In addition, the deep section acts as a cold zone which aids in preventing frying debris from charring before removal by filtration. The movement of fat or oil for filtration is largely confined to the base area of the frying kettle.

The food fryers according to the invention are particularly suitable for automatic operation. The burners preferably used have automatic ignition, which facilitates lighting, and may be controlled by a time clock. The frying apparatus according to the invention is preferably provided with a safety switch which detects the pressure generated by the suction device. Gas flow to the burners is prevented unless the suction device is operating. The food fryer is also preferably provided with an oil-level detector, generally an ultrasonic device, which prevents gas flow unless the frying medium in the kettle reaches a predetermined level.

The fryer is preferably provided with three thermostats, the first a low temperature thermostat which control the operation of the conveyor and is set at a temperature of about 95° C. The second thermostat is a control thermostat which is set to maintain the temperature of the frying medium at the frying temperature of 190°–195° C. by controlling the flame produced by the burners. A third over temperature thermostat is also preferably provided and this is set to switch off the gas flow when the temperature of the oil goes above a maximum temperature for safety, that is generally 215° C. Because of the nature of the gas train controls, these can be contained in much smaller area than these of fryers currently used. This simplifies construction and makes it possible to use a support frame which is cheaper and more easily kept clean.

There is also a substantial reduction in operating costs, since the combustion of the burners used is very much more efficient (up to at least 78%) than that of the burners used in existing fryers (40–50%) and the consumption of gas is therefore reduced. In addition, the quantity of oil or fat which has to be heated for a particular frying capacity, can be reduced by up to 20%, since the frying kettle is less deep than existing kettles with a saving in fat and oil consumption and a further saving in gas consumption. The life of the oil or fat is also extended using the apparatus according to the invention.

We claim:

1. Frying apparatus comprising:
   a frying kettle adapted to contain a frying medium;
   a pre-heater tank for preheating said fryer medium connected to said kettle to pass frying medium thereto;
   at least one heat exchanger tube removably fitted in said kettle;
   a high intensity suction burner for each tube adapted to produce combustion in said tube;
   means for connecting each said burner to its respective tube;
   a suction device connected to all of said tubes operable to produce a forced flow of combustion gases in said tubes and exhaust said gases from said tubes; and
   an additional heat exchanger tube fitted in said pre-heater and adapted to receive hot gases from said suction device.

2. Frying apparatus according to claim 1, wherein two heat exchanger tubes are provided.

3. Frying apparatus according to claim 2 wherein said two heat exchanger tubes are mounted through one end of said frying kettle one close to each corner, and extend down said kettle and loop back to the centre of said end through which they are mounted.

4. Frying apparatus according to claim 3 wherein said tubes are attached to said kettle by bolts which extend through the wall of said kettle.

5. Frying apparatus according to claim 1 wherein said suction device is selected from the group consisting of high temperature centrifugal fans and flue gas inducers.

6. Frying apparatus according to claim 5 wherein said suction device is provided with an independent damper for each of said heat exchanger tubes.

7. Frying apparatus according to claim 1 which further comprises a filter for said frying medium operatively associated with said kettle.

* * * * *